United States Patent [19]

Reynolds

[11] 4,356,543
[45] Oct. 26, 1982

[54] OVERCURRENT-PROTECTED INVERTER

[76] Inventor: William R. Reynolds, c/o Electronic Systems & Components, Inc., 110 Summit Ave., Chatham, N.J. 07928

[21] Appl. No.: 273,240

[22] Filed: Jun. 12, 1981

Related U.S. Application Data

[62] Division of Ser. No. 103,735, Dec. 14, 1979, Pat. No. 4,316,097.

[51] Int. Cl.³ .......................................... H02M 3/335
[52] U.S. Cl. ...................................................... 363/56
[58] Field of Search ...................... 363/55, 56; 361/18, 361/93, 100

[56] References Cited

U.S. PATENT DOCUMENTS

| | | | |
|---|---|---|---|
| 4,156,273 | 5/1979 | Sato | 363/56 |
| 4,162,524 | 7/1979 | Jansson | 363/56 |
| 4,236,187 | 11/1980 | Mochizuki et al. | 363/56 X |

Primary Examiner—A. D. Pellinen
Attorney, Agent, or Firm—Pearne, Gordon, Sessions, McCoy & Granger

[57] ABSTRACT

A battery pack-containing solid state circuit, normally in a standby condition, automatically applies battery-generated power to a multi-power requirement load a predetermined time period subsequent to detection of a malfunction in the load's normal power source. In switching to its power-applying state, the circuit disconnects the load from its malfunctioning power source and energizes the load at a level consistent with the battery pack capabilities. The circuit includes a unique fold-back-characterized, overcurrent-protected inverter and a temperature-compensated battery charger. A low battery voltage sensor exhibiting hysteresis characteristics inhibits operation of the circuit when the battery voltage drops below a predetermined level indicative of a discharge condition, the low voltage sensor continuing to inhibit operation of the circuit until a battery voltage charging input regains a level in excess of the predetermined level at which the discharged battery initially inhibited circuit operation. Restoration of normal power resets the circuit to a standby condition after a predetermined time period. The circuit finds particular application as an emergency power unit to effect lowering of an hydraulic elevator car and release of passengers therefrom.

4 Claims, 1 Drawing Figure

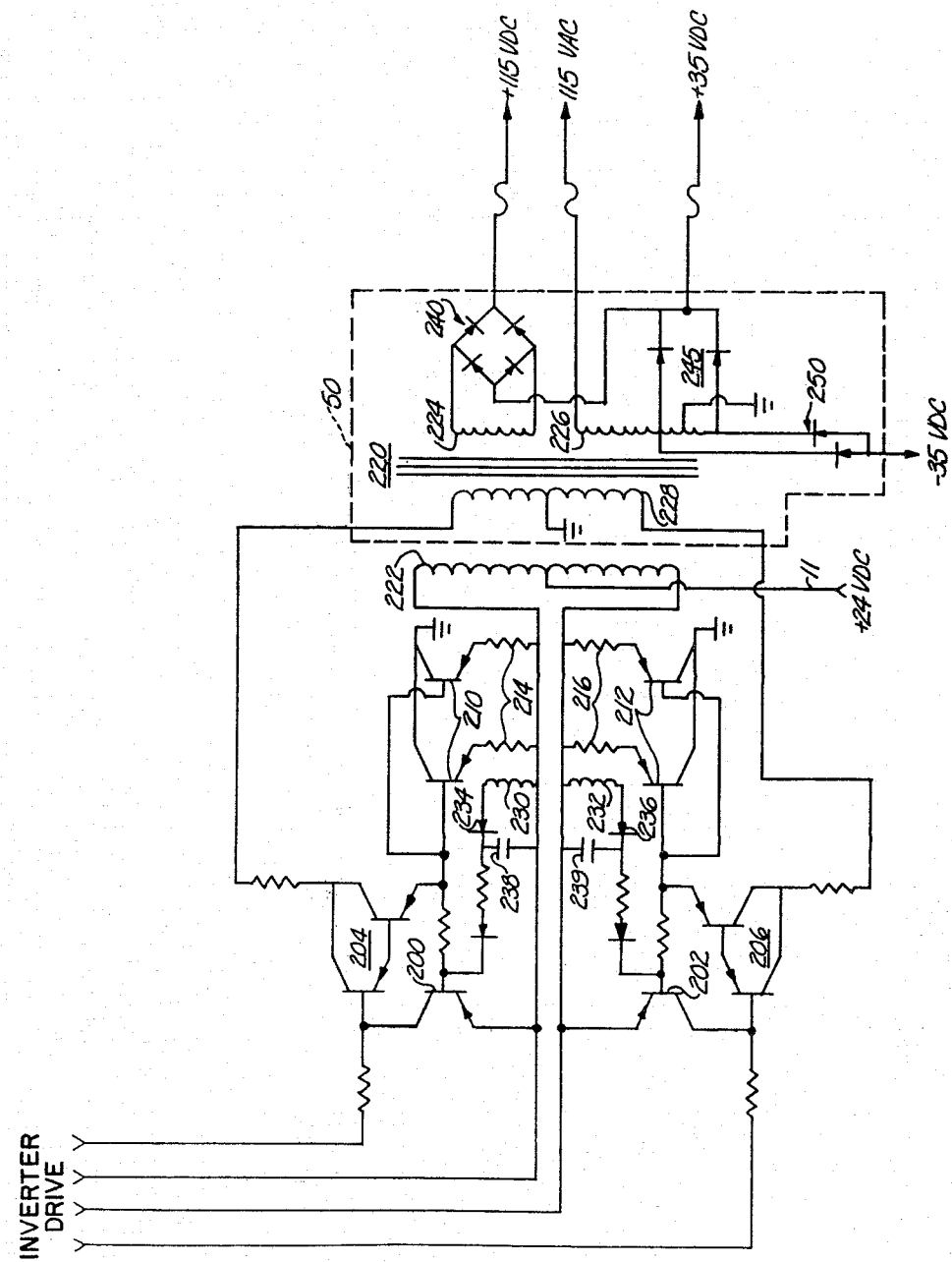

OVERCURRENT-PROTECTED INVERTER

This is a division of application Ser. No. 103,735, filed Dec. 14, 1979, now U.S. Pat. No. 4,316,097.

BACKGROUND OF THE INVENTION

The present invention relates in general to solid state power supplies, and more particularly to an overcurrent-protected inverter.

The present invention provides a solid state inverter that is overcurrent-protected by a unique feedback control means which automatically shunts triggering signals away from the power switches of the inverter to preclude their complementary, commutation-like switching under overload conditions indicated by the lack of a blocking signal which normally precludes trigger signal shunting away from the inverter switches.

BRIEF DESCRIPTION OF THE DRAWINGS

Other objects and a fuller understanding of the invention may be had by referring to the following description and claims, taken in conjunction with the accompanying drawing illustrating in schematic diagram fashion a foldback-characterized, overcurrent-protected inverter.

With reference to the drawing, a suitable complementary square wave inverter drive signal from a conventional inverter drive circuit is applied, respectively, to a first semiconductor switch means such as a trigger signal shunting transistor 200, and a second semiconductor switch means such as a trigger signal shunting transistor 202. Under normal conditions, the transistors 200 and 202 are in a non-conducting condition to permit full application of the square wave triggering signals (inverter drive) to a first pair of Darlington-connected base drive transistors 204 and a second pair of Darlington-connected base drive transistors 206. The collectors of the Darlington pairs 204, 206 are connected to the respective ends of a base drive power-generating secondary winding 228 of a step-up output power transformer 220, the winding 228 being center-tapped, as illustrated. The emitter leads of the transistor pairs 204, 206 are connected to drive the bases of unidirectional current power transistor switch pairs 210 and 212 or other suitable solid state power switch devices such as force commutated fast turn-off thyristors. The collectors of the power transistor switch pair 210 and 212 are connected to electrical ground, while their emitters are tied to respective ends of a center-tapped output power primary winding 222 constituting the primary side of the transformer 220, which is center-tapped. The center tap of the winding 222 is provided with power (+24 VDC) by the direct current bus supply line 12. In normal operation (transistors 200, 202 non-conducting), the inverter drive signals drive in complementary fashion the first and second trigger signal base drive transistor couples 204, 206, which in turn drive into conduction (saturation) the power trnansistor pairs 210 and 212, which causes generation of alternating current through the primary winding 222. The operation of such an inverter circuit configuration as explained in this point is well known in the art.

Upon alternating current flow through the primary winding 222, a plurality of secondary windings are inductively energized. The earlier-discussed base drive power generating secondary winding 228 provides voltage to the transistor pair 204 and 206 to in turn effect complementary firing of the transistor pairs 210 and 212. Multiple power output voltages are provided by a plurality of secondary windings in combination with plural rectifier means. A first power output voltage step-up secondary winding 224 provides AC power to a full wave bridge rectifier 240, which in turn provides, for example, +115-volt DC power. A second power output voltage step-up secondary winding 226 is illustrated as providing 115 volts AC. A portion of the winding 226 also energizes a first center-tapped full wave rectifier 245 providing +35 volts DC and a second center tap full wave rectifier providing a negative 35-volt DC.

In accordance with the present invention, overcurrent protection of the inverter is provided by at least one blocking signal generating winding. In the illustrated circuit, a pair of blocking signal AC generating windings 230, 232 provide charging current, via half-wave rectifier diodes 234, 236, to feedback voltage charged capacitors 238, 239. The capacitors maintain a generally steady state voltage that is supplied to the bases of shunting transistors 200 and 202. It can be seen that the windings 230, 232 alternately apply to the base electrodes of the shunting transistors 200, 202 the feedback voltages when their respective power transistor switches 210, 212 are in conducting conditions. Turn-on current to the bases of transistor 200 and 202 is provided by the voltage drops across current sensing resistors 214, 216 in series with the base-emitter junctions of the transistor pairs 210 and 212. Under normal conditions, the base drive current provided by the current sensing resistors 214, 216 is blocked from application to the shunting transistors 200 and 202 by the feedback voltage provided by the windings 230 and 232. Upon an overcurrent condition caused, for example, by shorting of one of the secondary windings 224 or 226, the voltage potential across the feedback windings 230, 232 at least partially collapses or extinguishes to a point to preclude its blocking effect to the turn-on current provided by the current sensing resistors 214, 216 wherein the transistors 200 and 202 are switched on to shunt the triggering signals (inverter drive) away from the base input of the Darlington transistor pairs 204 and 206, thus effectively precluding operation of the inverter. The inverter automatically folds back to a current limiting state. Such folding back is also effected by saturation of the core of the transformer 220 caused, for example, by an open circuit in the full wave bridge rectifier 240. Thus, the transformer 220 is protected against overcurrent conditions.

Upon clearing of the fault condition, the voltage across feedback windings 230 and 232 is re-established to effectively once again block application of turn-on current to the shunting transistors 200 and 202, wherein they switch to a non-conducting condition to permit reapplication of the triggering signals to the transistor pairs 204 and 206, wherein chopping of the +24-volt DC supplied by input line 12 is again effected to provide the multipower requirement output.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A foldback-characterized, overcurrent-protected inverter comprising:
   a direct current source having a current output and a current return;
   a transformer having a center-tapped primary winding and a plurality of secondary windings including at least one blocking signal generating winding, direct current from the current output of the source being applied to the center tap of the primary winding;
   first and second power transistor switch means each having a pair of power leads and a control input lead, one of the power leads of the first power transistor switch means being connected to one end of the primary winding, one of the power leads of the second power transistor switch means being connected to the other end of the primary winding, the other power leads of the first and second power transistor switch means being connected to the current return of the direct current source, application of complementary trigger signals to the control inputs causing complementary switching of the first and second power transistor switch means wherein the current supplied by the direct current source is chopped, and converted to alternating current by the secondary windings of the transformer;
   first and second driver means responsive to an inverter drive signal to provide the trigger signals to the transistor switch means;
   first and second inverter drive signal shunting transistors each connected to a respective one of the first and second driver means, the base electrodes of the shunting transistors each being responsive to at least one load current sampling resistor in electrical series relation with at least a portion of the primary winding wherein a voltage drop across the sampling resistor in response to load current through it generates a feedback signal constituted by a base drive current to the shunting transistors to switch them to a conducting condition wherein the inverter drive signal is shunted away from the first and second driver means to preclude complementary switching of the power transistor switch means; and
   a blocking signal generating circuit including the blocking signal generating winding of the transformer, the blocking signal generating winding providing a feedback voltage applied to the base electrodes of the shunting transistors, the feedback voltage blocking and opposing the application of the base drive current to the shunting transistors to hold them in a non-conducting condition, an overload condition on one or more of the transformer secondary windings causing at least partial collapse of the feedback voltage wherein the base drive current is applied to switch on the shunting transistors to preclude complementary switching of the power transistor switch means, said sampling resistor and at least one base-emitter junction of said power transistor switch means providing a series path for said base drive current, said blocking signal generating winding providing the feedback voltage to buck the voltage drop across the sampling resistor and base-emitter junction.

2. An inverter according to claim 1, wherein the blocking signal generating circuit includes a rectifier means series-inserted between the blocking signal generating winding and the base electrodes of the shunting transistors, the rectifier converting DC voltage generated by the feedback winding to DC voltage applied to the base electrodes.

3. An inverter according to claim 2, wherein the rectifier means is a half-wave rectifier alternately providing the feedback voltage to the respective base electrodes of the shunting transistors during the conduction periods of the respective power transistor switch means to which they are connected, wherein the feedback voltage is provided to the base electrode of the shunting transistor when the first power transistor switch means is in a conducting condition and wherein feedback voltage is provided to the base electrode of the shunting transistor when the second power transistor switch means is in a conducting condition.

4. An inverter according to claim 3, including capacitor means connected to the base electrodes and each of shunting transistor to maintain generally steady state feedback voltage on the base electrode intermittently provided by the half-wave rectifier.

* * * * *